March 24, 1953 C. A. DONALDSON 2,632,801
DEEP WELL CAMERA
Filed June 5, 1948 2 SHEETS—SHEET 1
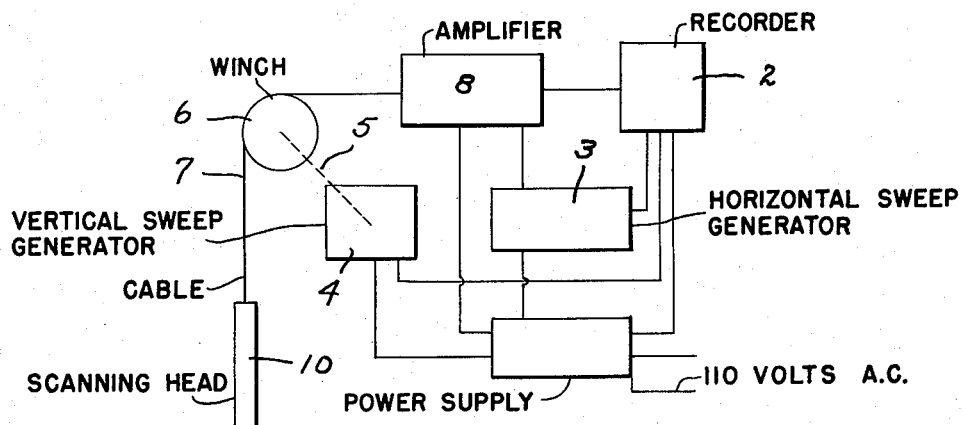
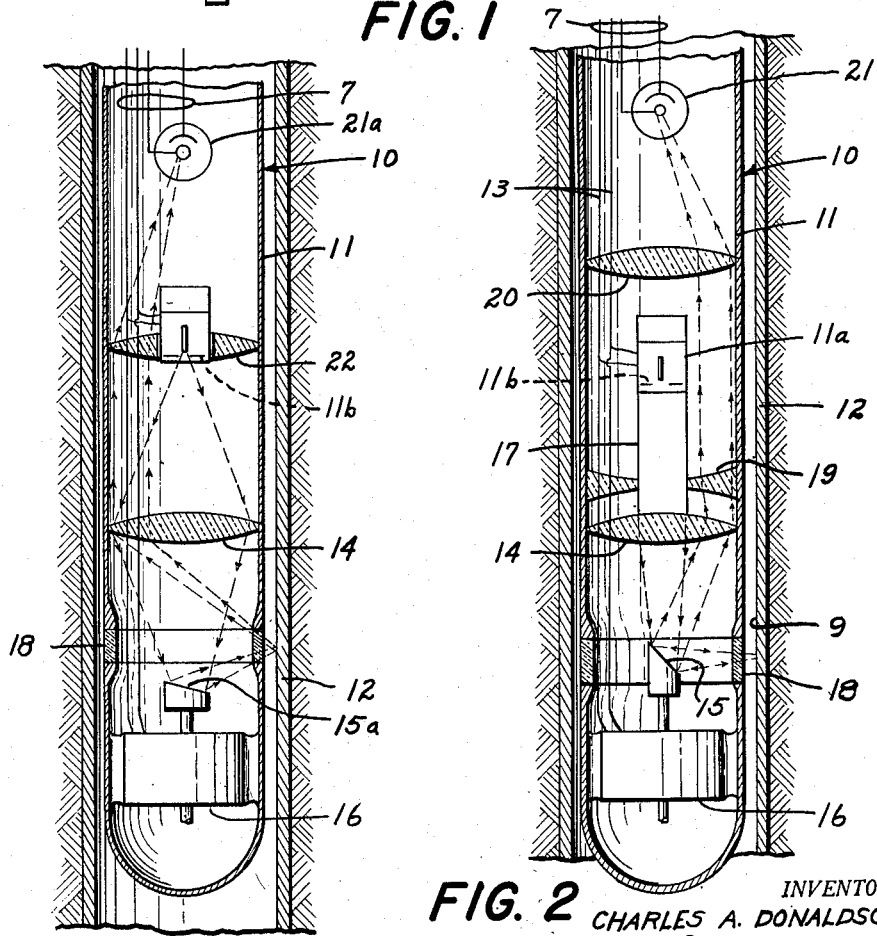
INVENTOR.
CHARLES A. DONALDSON
BY Lester B. Clark
& Ray L. Smith
ATTORNEYS.

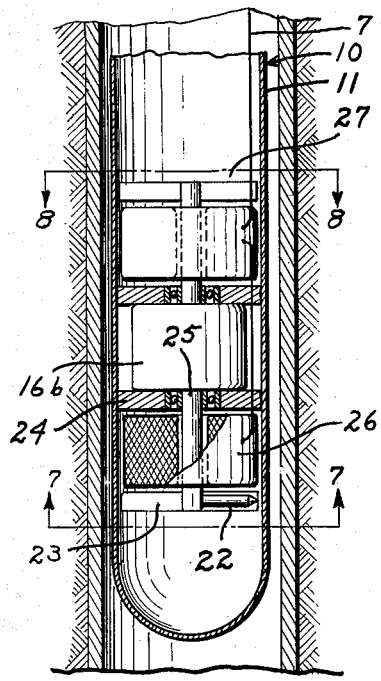
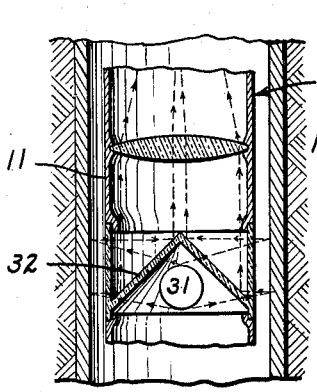
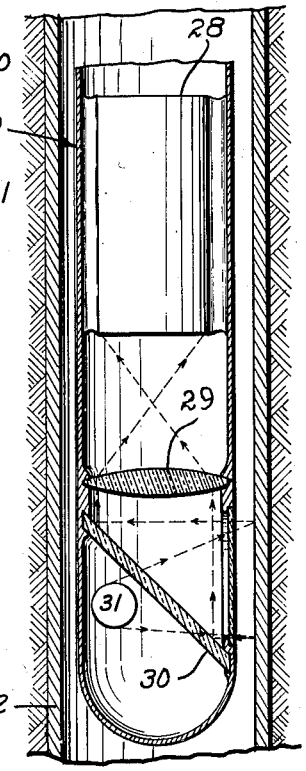
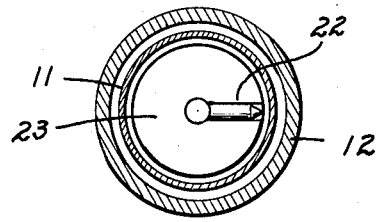
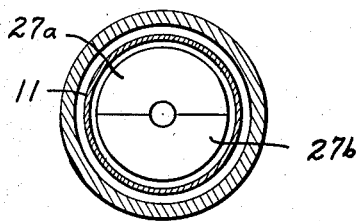

Patented Mar. 24, 1953

2,632,801

UNITED STATES PATENT OFFICE 2,632,801

DEEP WELL CAMERA

Charles A. Donaldson, San Antonio, Tex.

Application June 5, 1948, Serial No. 31,372

2 Claims. (Cl. 178—6.6)

This invention relates to improvements in systems and apparatus for inspecting the interior of pipes, and is of particular utility in the inspection of deep well casings in situ.

Should pitting or other irregularities exist or develop on the surface of pipe forming a deep well casing, it is important to locate these quickly and accurately. An example of apparatus for this purpose is disclosed in Patent No. 2,194,229, issued March 19, 1940, to Norris Johnston et al.

One of the objects of the invention is the provision of an improved system and apparatus of the character referred to, whereby the entire surface of the pipe can be inspected, and a visible indication or record made to show precisely the location of any surface irregularities.

Another object is the provision of an improved system and apparatus of the character referred to having advantages over those proposed heretofore as regards simplicity of construction, efficiency and reliability of operation, cost of manufacture, and the space occupied.

Other objects and advantages will be apparent from the following description considered in connection with the accompanying drawings, in which:

Fig. 1 is a simplified, diagrammatic view of a pipe-inspection system constructed and operating in accordance with my invention;

Fig. 2 is an enlarged, fragmentary, sectional view of the scanning head in Fig. 1;

Figs. 3, 4, 5 and 6 are views similar to Fig. 2, showing modifications; and

Figs. 7 and 8 are sections on the lines 7—7 and 8—8 respectively, in Fig. 4.

In the embodiment of my invention shown in Fig. 2, the scanner or scanning head 10 includes an elongated cylindrical casing 11 containing a point source of light which may be in the form of a concentrated arc lamp 11a, or a filament-type lamp, and associated diaphragm 11b having an aperture at the center thereof. Light from the source 11a is focused on the wall of the pipe or tubing 12 by a lens 14 and a mirror 15, the latter being fixed on the armature shaft of a motor 16, and set at an angle of forty-five degrees with the axis of the casing 11. The motor 16 is mounted with the axis of rotation of its armature coincident with the longitudinal axis of the scanning head and is supplied with electrical energy through the conductors 13 of the cable 7.

In operation, light from the source 11a passes through the slit in the diaphragm 11b and through the tube represented at 17, thence through lens 14 to the rotating mirror 15, whence it is reflected through window 18 to the surface 9 of the pipe 12. As indicated, some of the light is reflected back and passes through the peripheral annular portion of the lens 14, the annular concave lens 19 and the convex lens 20, and thence to the photoelectric cell 21. There is thereby developed a varying electrical signal which might be compared, in a general way, to the picture-signal developed or produced by the iconoscope of a television transmitting system. By way of the multi-strand cable 7 from which the scanner head is suspended, as represented diagrammatically in Fig. 1, this varying electrical signal is fed to the input side of an amplifier 8, and thence to a suitable form of recorder 2.

The recorder 2 in Fig. 1 may be in the form of a conventional cathode-ray tube whose horizontal sweep generator 3 has a frequency equal to the rate of rotation of the motor 16. Accordingly, for each complete revolution of the mirror 15, the cathode-ray of this tube is deflected horizontally across the fluorescent screen thereof. Simultaneously with this action, the scanner head 10 is raised or lowered at a relatively slow rate.

The vertical sweep generator 4, as designated by the broken line 5, is connected to and synchronized from the winch 6 used to raise or lower the scanning head 10 in the same manner as shown in Patent No. 2,338,991, issued January 11, 1944, to James C. Arnold. The generator 4 is of a conventional design embodying a potentiometer, the latter functioning to increase or decrease the direct current voltage applied to the vertical deflection plates of the recorder, or to the vertical coils of electro-magnetic deflection, if used. Accordingly, each horizontal deflection line is just above or just below the preceding line. It is proposed to use a long persistence screen, so that the successive lines build up a picture of the area scanned through the window 18. The speed of the winch 6 is slow enough that the lines drawn first will have just faded out as the vertical sweep reaches the opposite side of the picture. At this point, the potentiometer contact passes from the maximum voltage to the minimum, and the picture starts to build up for the next area. A P. P. I. type of picture with an open center may be used where the distortion, caused by the difference in length of the inside and outside circumference, is not too great a disadvantage.

It will be understood that since the horizontal sweep generator starts the sweep at the same angular position for each rotation of the mirror 15, the picture on the cathode-ray tube shows the pipe as though it were split open along a vertical line.

In the modification shown in Fig. 3, the rotating mirror 15a, which corresponds to and serves the same purpose as the mirror 15 in Fig. 2, is set at less than forty-five degrees with the axis of the pipe 12. Accordingly, the light reflected from the scanned spot passes back through the lens 14 and the annular convex lens 22 to the photoelectric cell 21a, without returning to the rotating mirror 15a. Such oblique scanning is conducive to greater contrast where the pipe or tubing 12 is pitted.

In the embodiment of the invention shown in Figs. 4, 7 and 8, the casing 11 of the scanning head is made of relatively thin brass tubing. A soft iron pin 22, set in a balanced non-magnetic disk 23, is rotated by the motor 16b which corresponds to the motor 16 in Fig. 2. Adjacent the motor 16b is a disk 24 of magnetic material which completes a magnetic circuit, namely, from the disk to the pipe 12, thence to the rotating pin 22 and back to the inside of the disk through the soft iron shaft 25 or through an auxiliary tube around this shaft. There are two air-gaps in this circuit. One is between the outside of the disk 24 and the pipe 12, and is almost constant. The other is between the wall of the pipe 12 and the rotating pin 22, and varies according to the condition of the pipe. Any change in the length of the air-gap, will generate a voltage in coil 26 which is applied through conductor cable 7 to the amplifier and recorder, as described heretofore.

The scanning head 10 in this form of the invention also comprises a segment shown as a half-circle 27a (Fig. 8) of iron and a second segment shown as a half-circle 27b of non-magnetic material. There is thus provided a second magnetic circuit similar to the one previously described but in which the elements 22 and 24 are replaced by the segment 27a and the disk 24'. With this construction, there will be generated a signal only if the pipe is out of round or if the head is not centered in the pipe. When it does develop a signal, it is used to buck the signal from the rotating pin 22, thereby insuring that the final signal is a true picture of the inside surface of the pipe.

Due to the fringing effect of the magnetic lines of force, the magnetic scanner does not give as good definition as the light scanner. It makes it possible, however, to check the outside of the pipe as well as the inside, a pit on the outside giving a smaller, but still useful signal. By using the magnetic scanner in conjunction with the light scanner it is possible to tell whether the pitting is inside or outside the pipe, as the light scanner will show whether a signal from the magnetic scanner is also picked up by the light inside the pipe.

It is understood of course that any suitable means may be used to produce a desired magnetic condition in the pipe 12 that detection of magnetic irregularities, due to defects in the pipe, may be detected as explained.

In the modification of the invention shown in Fig. 5, the scanning head 10 comprises a standard television camera tube represented at 28, a lens 29, a semi-transparent, 45 degree mirror 30, and a lamp 31 supported behind this mirror. The lamp 31 is placed at such an angle that no light reaches the lens 29 directly, but only after reflection from the wall of the pipe 12 vertical and horizontal sweeps are applied to the camera tube 28 and to the cathode-ray receiving tube on the surface. As will be understood by those skilled in the art, the necessary electrical connections for the television camera tube 28 and the lamp 31 (not shown) extend upwardly through the casing 11 and the conductor cable 7.

As shown in Fig. 6, if it is desired to give a 360 degree view of the pipe wall, a conical, semi-transparent mirror 32 may be substituted for the mirror 30. It may be noted that when using this form of the invention there will be considerable distortion in that portion of the image proximate its center, but that there is less and less distortion as the base of the mirror is approached. This would give an effect of looking axially of the pipe whereby a visual perspective is had.

Where a synchronous motor is used to drive the rotating heads, the horizontal sweep may be generated from the same source used to drive such motor. Otherwise, a high voltage signal is generated by a small strip mirror which reflects a bright light onto the photoelectric cell 21 at one point in the rotation.

From the foregoing, it will be seen that one of the broader aspects of my invention resides in the fact that the scanner head 10 is raised or lowered to effect scanning action of the same in the direction longitudinally of the pipe, and that means are provided for effecting scanning action of the scanner head circumferentially with respect to the pipe axis, whereby the interior surface of the pipe is scanned. It will also be understood that in event the interior of the casing 12 is dry, a liquid may be supplied to at least wet the inner cylindrical surface to enhance the reflective power thereof and thus giving greater light contrast whereby there is enhanced definition in the resulting image.

The invention also comprehends that the scanning impulses may be utilized as an input to an UHF transmitter within the unit or head 10 and in such case the pipe 12 serves as a wave guide to the surface where suitable detection and translation elements will provide the desired indication or record that the objectives of the invention are accomplished.

It will be understood that various embodiments of the invention other than those disclosed, are possible without departing from the spirit of the invention or the scope of the claims.

What is claimed is:

1. In a scanner head for pipe-inspecting apparatus and adapted to be lowered into the bore of a well, an elongated cylindrical casing provided at one end thereof with a window, an electric motor supported in said casing with its armature shaft substantially coincident with the casing axis, a photoelectric cell disposed in said casing at the other end thereof, a source of light disposed in said casing between said motor and said photoelectric cell, means for causing reflection of light from said source through said window, said light-reflecting means including a mirror fixed on said shaft, and means including a lens disposed in said casing and arranged to cause at least part of the light reflected back through said window to excite said photoelectric cell, said cell being adapted to receive electric power from the top of the well.

2. In a pipe-inspecting system for deep wells, a scanner head for insertion into the pipe forming the well casing, means for raising or lowering said scanner head to effect scanning action of the latter in the direction longitudinally of the pipe, means for effecting scanning action of said scanner head circumferentially with respect to the pipe axis and at a cooperative rate with respect to said first-named scanning action whereby the interior surface of the pipe is scanned, said second-named means including a mirror supported for rotation in said scanner head, means for causing rotation of said mirror, and means responsive to the scanning operation of said scanner head for providing an indication of irregularities over such interior surface.

CHARLES A. DONALDSON.

REFERENCES CITED

The following references are of record in the file of this patent:

UNITED STATES PATENTS

| Number | Name | Date |
|---|---|---|
| 1,857,130 | Alexanderson | May 10, 1932 |
| 2,019,059 | Sherman | Oct. 29, 1935 |
| 2,110,982 | Campbell | Mar. 15, 1938 |
| 2,209,719 | Rustad | July 30, 1940 |
| 2,258,124 | Nichols | Oct. 7, 1941 |
| 2,291,692 | Cloud | Aug. 4, 1942 |
| 2,298,911 | Young | Oct. 13, 1943 |
| 2,334,475 | Claudet | Nov. 16, 1943 |
| 2,359,894 | Brown | Oct. 10, 1944 |
| 2,394,649 | Young | Feb. 12, 1946 |
| 2,428,155 | Guyod | Sept. 30, 1947 |
| 2,433,971 | Adams | Jan. 6, 1948 |
| 2,450,649 | Finch | Oct. 5, 1948 |